United States Patent Office 3,606,667
Patented Sept. 21, 1971

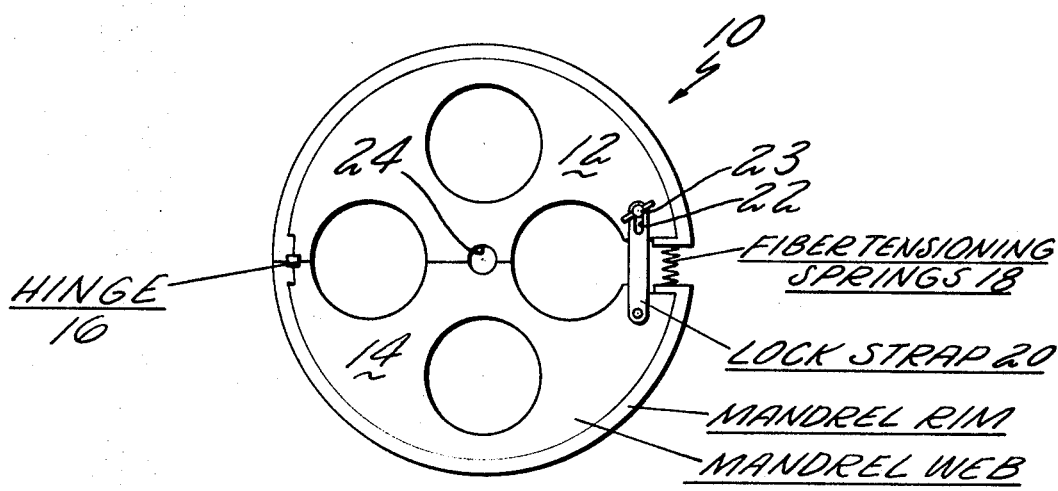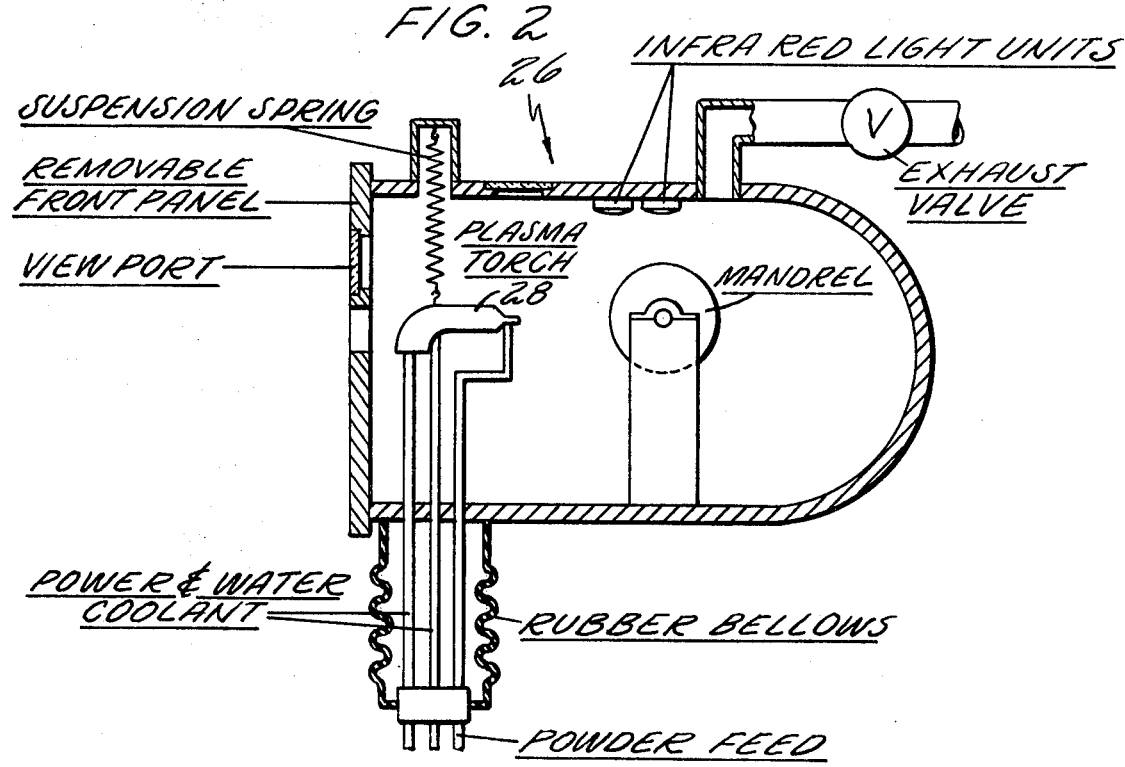

3,606,667
METHOD OF FABRICATING FIBER-REINFORCED ARTICLES
Kenneth G. Kreider, Glastonbury, Conn., assignor to United Aircraft Corporation, East Hartford, Conn.
Filed Sept. 27, 1968, Ser. No. 763,278
Int. Cl. B23p 17/00
U.S. Cl. 29—423      17 Claims

ABSTRACT OF THE DISCLOSURE

Filaments characterized by high strength, high rigidity, and high resistance to deterioration at elevated temperatures are utilized in a process of fabricating a multilayer fiber-reinforced metal matrix composite by winding a filament on a foil-covered, spring-loaded mandrel, preheating the mandrel, plasma arc spraying metal matrix material in coalescent form onto the filament windings so as to form a monolayer tape, and diffusion bonding a plurality of such tapes together in layers, the process being characterized by a high degree of reproducibility.

BACKGROUND OF THE INVENTION

The present invention relates to the production of fiber-reinforced composites and more particularly relates to the production of fiber-reinforced monolayer composite tapes which are diffusion bonded together.

It is known that fiber strengthening offers the potential of significant improvements in the fabrication of composite structural materials designed to meet the imposing requirements of space-age hardware. The concept of fiber strengthening is based on the fact that materials produced in the fibrous form frequently exhibit a higher elastic modulus and a larger elastic strain capacity and, hence, higher stiffness and strength than the corresponding materials in bulk. The development of structural high modulus composites has received considerable attention in the past few years. Progress has been made in the development of high-strength, high-quality fibers, such as boron and silicon carbide, for example. These fibers combine the high strength of fiber glass with a high modulus and suggest the feasibility of fabricating fiber-reinforced structures having a superior balance of strength and stiffness. In order to exploit these properties, it is necessary to gather these fibers together into a composite structure in such a way that failure in several isolated fibers will not be transmitted to the surrounding fibers, and further, to distribute the load with reasonable uniformity over the entire fiber bundle. One method of effecting this result is to encase multiple layers of uniformly distributed fibers in a matrix material which will deform plastically. The achievement of such high modulus composites having a high strength to density ratio is dependent on several primary factors.

In order to be structurally efficient, the matrix material must possess high strength and large elongation capabilities. High strength is necessary in order to transfer stresses between fibers so that discontinuous fibers are reloaded. The plastic strain capability must be high enough to resist fracture under severe localized strain, particularly at fiber fracture ends and between fiber layers.

Additionally, the residual stresses in the composite caused by differences in thermal contraction between the fiber and matrix during cooling must be minimized. It has been found that the difference between the coefficients of thermal expansion of, for example, boron fibers and an aluminum matrix can result in 0.5% strain upon cooling from 400° F. with the matrix in residual tension.

Furthermore, it is necessary in a fiber-reinforced composite that the fibers be uniformly spaced in order to achieve high matrix tensile strength and uniform off axis properties. One of the most important factors for producing uniform spacing is the provision of a flat and smooth winding surface or substrate.

Finally, to be commercially feasible, a process which achieves the above-desired properties must be able to achieve them consistently so that the product composite will be highly reproducible.

One of the paramount problems in obtaining high-strength high-modulus composite articles involves the actual process of incorporating fibers into the matrix material to provide the desired end item. Several prior art processes have been employed for the fabrication of metal matrix composites. These include such techniques as molten metal infiltration, vapor deposition, electrodeposition, eutectic solidification and plasma arc spraying. One example of the latter method is described in a patent filed Feb. 19, 1964, by Robert G. Cheatham and Joseph F. Cheatham, U.S. 3,427,185, entitled Composite Structural Material Incorporating Metallic Filaments in a Matrix and Method of Manufacture, which shares a common assignee with the instant invention. In that process, multiple layers of filaments are incorporated in a metal matrix by arranging a filament or mat of filaments directly on a mandrel, plasma spraying a metal matrix thereon and subsequently repeating the winding and spraying steps on each preceding composite fiber-matrix layer for the desired number of times. In other words, a multilayer composite is produced by building up alternate layers of fiber and metal matrix on each other.

Although the prior art processes result in fiber-reinforced metal matrix composites of increased strength to density and modulus to density ratios, their structural efficiency is impaired by a relatively weak bonding between composite layers, particularly where there is a high fiber volume fraction, and by residual stress concentrations caused by different coefficients of thermal expansion for the fibers and the matrix which are difficult to control with respect to uniformity and severity. Furthermore, fiber spacing, which is apparently critical in off axis strength, is uneven because the substrate for the filament winding is not flat after several layers have been built up. Still further, the prior art processes are difficult to pursue when attempting to make multilayered composites of complex shape since the ability to wind monofilaments to such a shape with the requisite degree of uniformity is greatly limited. On a broad scale then, there is a serious reproducibility problem associated with the above techniques which stems basically from an inability to insure that the filaments and hence the matrix material will be provided in the same location, in the same quantity, and in the same quality in each article. Quite to the contrary, articles produced by the foregoing methods may vary significantly with respect to their physical properties despite the most careful attention to process details.

SUMMARY OF THE INVENTION

The present invention relates to fiber-reinforced articles and, more particularly, to an improved process for fabricating such articles to provide a maximum and uniform fiber fill, as desired, and impart reproducibility to the fabrication from one article to the next. It contemplates the use of filaments as, for example, boron, silicon carbide or boron coated with silicon carbide and a metal matrix material as for example aluminum or magnesium, to make monolayer tapes which are easily handled and highly reproducible. The tapes are preferably integrated into a multilayer composite of extreme cross-sectional uniformity.

In accordance with one aspect of the present invention, a multilayer composite is produced from a plurality of single layer plasma sprayed tapes which are each fabricated on a substrate under identical circumstances with respect to stress and temperature. A single filament is wound in helical collimated relation on a foil-covered, mechanically expandable mandrel. The filament is uniformly tensioned and preheated to a predetermined level and a metal matrix material is applied by plasma arc spraying. The resulting tapes possess excellent filament-matrix bonding characteristics with no signs of fiber degradation and are preferably formed into a multilayer composite of the desired shape by consolidating the requisite number of tapes together in layers and subjecting them to a hot pressing operation.

By means of the present invention, not only is the production of structural high modulus multilayer composites attained, but composites so produced are possessed of superior properties which are extremely uniform and highly reproducible. The process is simple and inexpensive, and yields precisely spaced fibers with a minimum of residual stress in the composite. Strong fiber-matrix bonding is achieved without fiber degradation and the technique of producing, as an intermediate product, monolayer tapes, resolves the problem of monofilament handling and permits the fabrication of large and complex parts with ease. Since the correct filament-matrix volume ratio may be established prior to the tape laying step, variations in the ratio as a result of unavoidable variations in techniques are minimized. As a consequence of the teachings herein, a high-strength, high modulus metal matrix composite is achieved in a manner heretofore unknown.

BRIEF DESCRIPTION OF THE DRAWINGS

FIG. 1 is a side elevational view of a mandrel used during composite fabrication;

FIG. 2 is a side elevational view, partly in section, of a plasma spray chamber.

DESCRIPTION OF THE PREFERRED EMBODIMENTS

Figure 3:
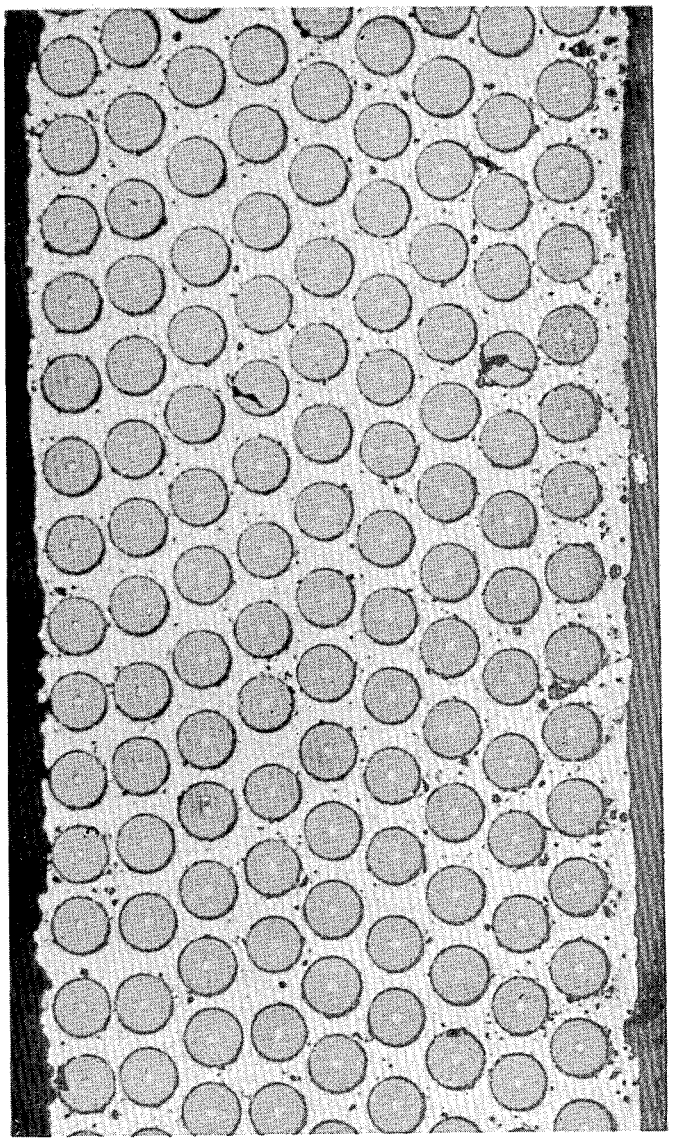

Referring now to the drawings, wherein like numerals indicate like parts, the numeral 10 designates a hollow, cylindrical, diametrically split mandrel comprised of a pair of matching semi-cylindrical pieces 12 and 14. The mandrel pieces are secured together at their interface by a hinge 16 at one end and are pivotally separable to a controlled degree by means of a pair of springs 18 and a locking strap 20 located at the opposite end. The strap 20 is provided with a longitudinal slot 22 adjacent one end. A thumbscrew 23, having an enlarged head, is suitably received in the slot 22 and is operable to lock the mandrel in a spring-expanded position. The mandrel 10 has a central axial passageway 24 adapted for receipt of an appropriate driving shaft (not shown) so that the mandrel is both rotatable and axially movable.

According to the practice of the invention, with the springs biasing the pieces outwardly, the mandrel is locked in the open position and a selected sheet of metal foil is laid in a single layer in covering relation over the entire cylindrical surface thereof in a smooth and uniform manner. In order to prevent wrinkling during fabrication, the foil is preferably of a material which is thermally compatible with the mandrel, that is, it must have a coefficient of expansion which is substantially the same therewith. One of the primary advantages for using metal foil as a substrate material is the fact that it improves the handling characteristics of the monolayer tape and gives it a significantly increased degree of toughness. As explained hereinafter, the foil is made adherent to the fibers and is subsequently incorporated into the matrix material.

Filamentary material is selected and wound in closely laid, evenly spaced helical convolutions on the foil. This can be accomplished by drawing continuous filament from a supply reel, securing the end of the filament adjacent the side of the mandrel, and guiding the filament under winding tension, by suitable pay off means while the mandrel is rotated. The exact mechanism by which the fiber is laid on the foil substrate is not considered part of the present invention and those skilled in the art will recognize that there are many alternative schemes for placing filaments, in tension, on a mandrel in a collimated manner. By the term collimated is meant the state wherein adjacent fiber lengths are evenly and uniformly spaced from each other and such a concept is equally applicable to a single fiber helically wound on the mandrel or a plurality of fibers wound on the mandrel and residing in parallel planes.

Upon completion of the winding, the filament is broken and affixed to the mandrel and the restraining strap 20 is released. The mandrel is then positioned in a plasma spray chamber 26 where deposition of the metal matrix material by means of a plasma torch 28 can be accomplished in an argon atmosphere. Prior to spraying, the mandrel, metal foil and wound filaments are preheated to a temperature sufficiently high to assure bonding to the matrix during plasma spraying. The actual heating is accomplished both by infrared lighting and by the plasma torch. In the case of aluminum foil, a temperature between 400° and 600° F. results in good adherence while a temperature below 200° results in non-adherence. During spraying, the mandrel is rotated and traversed in front of the stationary plasma arc in order to obtain an even layer of matrix material. Variables which affect the plasma flame are the power input to the arc, the geometry and size of the arc electrodes, and the composition and flow rate of the plasma gas. Deposits were made with 400–500 amperes, 30–35 volts, and 140–160 cu. ft./hr. S.T.P. of argon. In addition to these variables, the deposit is affected by controlling the rate of powder feed, the position of the powder feed inlet hole of the plasma, the size distribution of the powder, the torch to substrate distance, the nature of atmosphere surrounding the plasma exhaust flame and the substrate, and the substrate temperature. Composites were made with a moderate feed rate with respect to saturation (3 pounds per hour of metal powder spray), the powder inlet located in the ionizing zone of the arc, −240 +400 mesh size spherical metal powder, a four to five inch arc to substrate distance, an argon atmosphere, a substrate temperature of 400°–600° F. and a relative velocity of the plasma spray arc across the substrate of two to eight inches per second.

The instant technique of preheating and plasma spraying not only causes the coalescent particles of matrix metal to encase the fibers and adhere to them, but at the same time causes the mandrel to thermally expand so as to operate against the bias of springs 18 and cause the mandrel pieces 12 and 14 to close. The mechanical contraction of the thermally expanding mandrel minimizes the variations of tensile strain to which the filaments would otherwise be subject. When the spraying is complete, the tape and the mandrel are cooled to room temperature and during the cooling process, the opposite compensatory mandrel action occurs. The thermally contracting mandrel is mechanically expanded by the action of the springs 18 so that the difference between the coefficients of thermal expansion of the fibers and matrix is accounted for. In all, the fibers are subjected to not greater than 0.3% strain at spraying temperature.

After cooling, the monolayer tape is removed from the mandrel by cutting in the desired manner. The tape may for example, be severed transversely so as to form a flat tape having dimensions of the width and girth of the mandrel or alternatively, in the form of a helix having dimensions of width narrower than the width of the mandrel and of length longer than the girth of the mandrel.

Once the tape is removed, it is preferably subjected in general, along with other like tapes, to a secondary fabrication technique. In particular, the monolayer tapes are diffusion bonded by hot pressing in a non-oxidizing atmosphere. The desired number of tapes are laid up, one upon the other, between steel platens or dies and are subjected to an elevated temperature and pressure until the foil is incorporated into the sprayed matrix and the required densification is achieved.

Various experiments were conducted to establish the efficiency of the techniques hereinbefore described. One of the multilayer composites resulting from the diffusion bonding of plasma-sprayed monolayer tapes of aluminum matrix-silicon carbide coated boron filaments (Borsic$_{TM}$) achieved 50 volume percent of fiber with excellent filament distribution. During the practice of the invention, an aluminum mandrel 6 inches wide and 20 inches in diameter was provided with a pair of auto-valve springs, each having a spring constant of 900 lb./in. The strap 20 was operable to lock the mandrel at a maximum separation distance of ¼ inch. Aluminum and magnesium matrix materials were at various times applied to boron, silicon carbide and silicon carbide coated boron filaments. It is to be understood that whenever the word aluminum or the word magnesium is used herein, it includes reference not only to the pure metal but also to the respective aluminum-base alloys and magnesium-base alloys. The fiber, matrix and foil materials used in the fabrication of composites are enumerated in Table I.

silicon carbide fiber and boron fiber. It was found that by using an 1145 alloy aluminum foil in the fully hardened condition, better quality control of the composite tape is maintained. The aforesaid foil, when in the fully hardened condition, improves the flatness, smoothness and ease of fabrication of the plasma sprayed single layer tape. Composites of good quality are also fabricated from 6061 alloy foil 0.0023 inch thick and from rerolled 6061 alloy 0.001 inch foil. Usage of the latter foil permits fabrication of composites having 50% by volume of fiber.

In one experimental investigation, tapes consisting of Borsic fiber (nominal diameter 4 mils) were wound at 185 turns/inch on 1145 aluminum alloy foil 0.001 inch thick and sprayed with a 6061 aluminum alloy matrix. The tapes were hot pressed in an argon atmosphere for one hour at 500° C., 550° C. and 600° C. at pressures ranging from 50 to 6700 p.s.i. The initial thickness of the tapes prior to hot pressing was 9.7 mils with a tape density of 0.20 gram/in.$^2$. The limiting point of compaction was 4 mils/layer. At 600° C., 800 p.s.i. was the limiting pressure for full compaction whereas at 550° the limiting pressure was approximately 5200 p.s.i. Similar results obtained when the hot pressing occurred in a vacuum and the use of either argon or vacuum is far superior to hot pressing in air which results in undesirable oxidation.

The same hot pressing technique is used in bonding boron fiber-aluminum alloy matrix tapes together. At 560° C. however, very serious boron fiber degradation results. Fibers removed from the composite with dilute hydrochloric acid show a degradation in average strength from 480,000 to 130,000 p.s.i. and the composites are weak (78,00 p.s.i. with 41% volume of boron). At 490° C. significant degradation also occurs in the fibers (approximately 25%) and the composites do not have strengths as high as those hot pressed at lower temperatures. With a temperature of 400° C., and a pressure of 1000 p.s.i., boron-aluminum tapes do not achieve full densification and the matrix is somewhat brittle. A pressure of 10,000 p.s.i., however, results in full densification.

Diffusion bonding by hot pressing indicates the practical advantages, particularly where large composite structures are to be fabricated, of employing the highest tem-

TABLE I.—MATERIALS FOR COMPOSITE FABRICATION

| | Diameter in inches | Modulus 10$^6$, p.s.i. | Average ultimate tensile strength, p.s.i. | Source |
|---|---|---|---|---|
| Fiber: | | | | |
| Boron | .0039–.0041 | 55–60 | 425,000 500,000 | United Aircraft Research Labs (UARL). |
| Boron with .00010 to .00015 inch SiC coating (BORSIC$_{TM}$) | .0039–.0041 | 55–60 | 425,000 500,000 | UARL. |
| SiC | .0027–.0033 | >50 | 275,000 400,000 | UARL. |

| | Type | Size range | |
|---|---|---|---|
| Metal powder: | | | |
| 1100—Commercially pure aluminum | Spheroidized | [1] 15–44 | Thermal Dynamics. |
| 6061—aluminum alloy (1.0% Mg, 0.5% Si, bal. al) | Atomized | [2] −270+400 | Reynold's Metal Co. |
| 2024—aluminum alloy (4.5% Cu, bal. Al) | do | [2] −270+400 | Alcoa. |
| 360—aluminum alloy (9.0% Si, bal. Al) | do | [2] −170+400 | Reynold's Metal Co. |
| 390—aluminum alloy (8.0% Si, 3.0% Cu, bal. Al) | do | [2] −170+400 | Do. |
| magnesium alloy (10.0% Al, bal. Mg) | do | [2] −200+400 | Valley Metallurgical Processing Co. |

| | | Thickness, inch | |
|---|---|---|---|
| Metal foil: | | | |
| 1100 | Annealed | 0.001 | "Kitchen Wrap". |
| 6061 | do | 0.001–0.003 | Reynolds. |
| 713 | | 0.001–0.002 | Alcoa. |
| 1145 | Hard | 0.001 | |

[1] Micron. [2] Mesh.

Considerable fabrication development was performed utilizing a system of plasma sprayed 6061 aluminum alloy powder, Borsic fiber and 1145 aluminum alloy .001 inch thick foil. Composites were also fabricated with perature consistent with retention of desirable fiber properties since the higher the temperature, the lower the pressure required for full densification.

Various composites produced by the foregoing monolayer technique were subjected to mechanical property evaluation, the results of which are set forth in Table II.

TABLE II.—MECHANICAL PROPERTIES OF ALUMINUM MATRIX UNIDIRECTIONAL COMPOSITES

| Specimen | Volume percent, fiber | Matrix [1] | Tensile modulus 10⁵, p.s.i. | Ultimate tensile strength, p.s.i. | Poisson ν | Strain at fracture |
|---|---|---|---|---|---|---|
| 347 | 39%, B | 1100/1100 foil | 23.7 | 131,000 | | |
| | | | | 133,000 | | |
| | | | | 156,000 | | 0.0051 |
| 394 | 55% SiC | 6061/1145 foil | 26.8 | 89,000 | | 0.0029 |
| | | | | 100,000 | | 0.0036 |
| 341 | 47%, BSiC | 360/1100 foil | 25.6 | 107,000 | | |
| | | | | 103,000 | | |
| | | | | 110,000 | | 0.0042 |
| 344 | 48%, BSiC | 6061/1100 foil | 28.2 | 135,000 | .227 | |
| | | | | | .225 | |
| | | | | | .230 | |
| 346 | 47%, BSiC | do | 31.8 | 155,000 | | 0.0053 |
| | | | | 155,000 | | |
| 350 | 53%, BSiC | 390/1100 foil | 31.5 | 115,000 | | 0.0037 |
| | | | | 110,000 | | 0.0043 |
| 354 | 50%, BSiC | do | 28.5 | 119,000 | | 0.0039 |
| | | | 31.1 | 100,000 | | 0.0035 |
| 394 | 52%, BSiC | 6061/1100 foil | | 185,000 | | |
| 365 | 50%, BSiC | do | | 157,000 | | |
| 392 [2] | 50%, BSiC | do | 31.5 | 161,000 | | 0.0053 |
| | | | 30.5 | 168,000 | | 0.0058 |
| | | | 30.9 | 147,000 | | 0.0051 |

[1] 6061/1100 foil indicates 6061 plasma sprayed on 1100 alloy foil.
[2] Sprayed in air.

While Table II indicates the fairly wide range of properties available as a result of the materials selected, a perhaps more important feature of the monolayer tape technique resides in the attractive reproducibility characteristics inherent in the process. Table III indicates the reproducibility of strength of composite specimens standardized by the monolayer process.

TABLE III.—TENSILE STRENGTH OF ONE INCH GAGE LENGTH BORSIC-ALUMINUM COMPOSITES (50% BORSIC)

| Specimen No. | Ultimate tensile strength (p.s.i.) | Specimen No. | Ultimate tensile strength (p.s.i.) |
|---|---|---|---|
| 389 E: | | 390 I: | |
| 1 | 165,000 | 1 | 159,000 |
| 2 | 148,000 | 2 | 167,000 |
| 3 | 145,000 | 3 | 173,000 |
| 389 K: | | 390 N: | |
| 1 | 161,000 | 1 | 140,000 |
| 2 | 161,000 | 2 | 139,000 |
| 3 | 145,000 | 3 | 144,000 |
| 390 A: | | 393: | |
| 1 | 184,000 | 1 | 161,000 |
| 2 | 152,000 | 2 | 189,000 |
| 3 | 164,000 | 3 | 172,000 |
| 4 | 161,000 | | |
| 390 C: | | 395 C: | |
| 1 | 161,000 | 1 | 161,000 |
| 2 | 134,000 | 2 | 149,000 |
| 3 | 160,000 | 3 | 152,000 |
| 4 | 160,000 | 4 | 155,000 |
| 390 F: | | 483: | |
| 1 | 182,000 | 1 | 177,000 |
| 2 | 154,000 | 2 | 163,000 |
| 3 | 163,000 | 3 | 179,000 |
| 4 | 163,000 | 4 | 169,000 |

The data shown in Table III was derived by fabricating standard composites containing 50% Borsic filament and a matrix of 1145 foil and plasma sprayed 6061 powder. The results indicate that 80% of the values fell within the range 160,000 p.s.i.±10%.

In one investigation, Borsic fiber, 4.2×10⁻³ in. diameter was wound on .001 inch 6061 alloy foil on the 20 inch mandrel, pretensioned 0.3% (180,000 p.s.i.), preheated to 400° F. and plasma sprayed at 400–500° F. (substrate temperature) with 6061 powder until 60% by volume of fiber was achieved. Eight layers of the tape were hot pressed at 450° C. and 5000 p.s.i. for one hour into a unidirectional composite. The tensile strength average (4 tests) was 181,000 p.s.i. and the longitudinal modulus average was 39.5×10⁶ p.s.i.

The present invention is not limited to aluminum as a matrix material. In one series of tests, boron fibers were wound on the mandrel, preheated to 400° F., pretensioned 0.3% (180,000 p.s.i.) and plasma sprayed at 400–500° F. with a 90% Mg-10% Al powder until 50% by volume of fiber was achieved. Eight layers of such tape were hot pressed at 400° C. and 4000 p.s.i. for one hour into a unidirectional composite. The tensile strength average (6 tests) was 175,000 p.s.i. and the longitudinal modulus average was 32×10⁶ p.s.i.

In the practice of the present invention, it is recognized that several other modifications can be made. It is recognized for example, that plasma spraying can be performed in air in order to promote a simpler and less expensive technique. Composites from tapes sprayed in air were diffusion bonded with up to twenty layers in thickness. There is no significant difference noted in the microstructures of these composites as compared to those sprayed in argon. The properties of these composites are also found to be nearly equivalent to those fabricated in an argon atmosphere.

It is also recognized that the present invention is not limited to the fabrication of unidirectional fiber-reinforced composites. The fabrication of composites having monolayer tape cross plies in multiple orientation was also achieved. The strength in a reinforced direction in such composites equals 320,000 p.s.i. times the fiber volume fraction in that direction.

It will readily be seen that, through the use of the techniques hereinbefore described, fiber-reinforced articles of carefully controlled density can readily and reproducibly be fabricated. While the invention has been described with reference to specific examples, fabrication parameters and materials, these embodiments and conditions are intended to be illustrative only. Various modifications and alternatives, other than those already mentioned, will be readily evident to those skilled in the art within the true spirit and scope of the invention as set forth in the appended claims.

What is claimed is:

1. In a method for forming a metal matrix filament reinforced structural material by plasma arc spraying coalescent metal matrix material on the filaments, the improvement which comprises:

winding a filament, under tension, in a helically collimated monolayer on a mandrel;

depositing the metal matrix material in a coalescent form on the filaments by plasma arc spraying to encase said filaments and form a monolayer composite tape therewith;

maintaining said mandrel against expansion so that the filaments are subjected to not greater than 0.3% strain; and removing said tape from the mandrel.

2. The improvement of claim 1 wherein said mandrel is covered with a sheet of metal foil prior to filament winding.

3. In a method for forming a metal matrix filament reinforced structural material by plasma arc spraying coalescent metal matrix material on the filaments, the improvement which comprises:
 laying, in a smooth and flat manner, a sheet of metal foil on a mandrel;
 winding a filament, under tension, in a helically collimated monolayer on said metal foil sheet;
 depositing the metal matrix material in a coalescent form on the filaments by plasma arc spraying to encase said filaments and form a monolayer composite tape; and
 removing said tape from the mandrel.

4. The improvement of claim 3 wherein said foil and said mandrel have substantially identical coefficients of expansion.

5. In a method for forming a metal matrix filament reinforced structural material by plasma arc spraying coalescent metal matrix material on the filaments, the improvement which comprises;
 winding a filament under tension in a helically collimated monolayer on a thermally expandable mandrel;
 depositing the metal matrix material in a coalescent form on the filaments by plasma arc spraying to encase said filaments and form a monolayer composite tape therewith;
 providing for mandrel contraction during thermal expansion thereof so that the filaments are subjected to not greater than 0.3% strain; and
 removing said tape from the mandrel.

6. The improvement of claim 5 including the step of diffusion bonding a plurality of such tapes together in layers.

7. The improvement of claim 5 wherein said mandrel is covered with a sheet of metal foil prior to filament winding.

8. The improvement of claim 7 wherein said mandrel is preheated to a temperature sufficient to cause adherence of said foil to said filaments.

9. The improvement of claim 8 wherein said filament is of a material selected from the group consisting of boron, silicon carbide and silicon carbide coated boron.

10. The improvement of claim 9 wherein said matrix material is aluminum.

11. The improvement of claim 9 wherein said matrix material is magnesium.

12. The improvement of claim 10 wherein said foil is aluminum.

13. The improvement of claim 12 wherein said mandrel is aluminum.

14. The improvement of claim 13 wherein said mandrel is preheated to a temperature within the range of 400° to 600° F.

15. In a method for forming a metal matrix filament-reinforced structural material by plasma arc spraying coalescent metal matrix material on the filaments, the improvement which comprises:
 wrapping a layer of metallic foil on a mandrel;
 winding a filament in a helically collimated monolayer on said foil;
 preheating said mandrel to a temperature sufficient to cause bonding between the foil, filament and matrix during spraying;
 depositing said metal matrix in coalescent form on said filaments by plasma arc spraying to encase said filaments and, with said foil, for a monolayer composite tape; and
 cooling said tape and removing it from said mandrel.

16. The improvement of claim 15 wherein said mandrel is spring-loaded so that at spraying temperature, the filament is subjected to not greater than 0.3% strain.

17. The improvement of claim 16 including the step of diffusion bonding a plurality of such tapes together in layers whereby the foil is incorporated into the matrix.

References Cited
UNITED STATES PATENTS

| | | | |
|---|---|---|---|
| 2,100,029 | 11/1937 | Gammeter | 117—105.1X |
| 2,944,338 | 7/1960 | Graig | 29—423 |
| 3,017,492 | 1/1962 | Jepson | 29—191.4X |
| 3,112,539 | 12/1963 | Barker | 117—105X |
| 3,273,226 | 9/1966 | Brous et al. | 29—423X |
| 3,427,185 | 2/1969 | Cheatham et al. | 117—105.1X |

JOHN F. CAMPBELL, Primary Examiner
V. A. DiPALMA, Assistant Examiner

U.S. Cl. X.R.
117—93.1, 105.1

PO-1050
(5/69)

UNITED STATES PATENT OFFICE
CERTIFICATE OF CORRECTION

Patent No. 3,606,667                     Dated   September 21, 1971

Inventor(s) KENNETH G. KREIDER

It is certified that error appears in the above-identified patent
and that said Letters Patent are hereby corrected as shown below:

Column 1, line 25 as a separate paragraph, please insert the following:

-- The Invention described in claims 1, 2 and 5-17 was made in the course of or under a contract or subcontract thereunder with the Department of the Air Force. --.

Signed and sealed this 12th day of March 1974.

(SEAL)
Attest:

EDWARD M. FLETCHER, JR.                C. MARSHALL DANN
Attesting Officer                      Commissioner of Patents